July 21, 1942.  L. B. SLONEKER  2,290,623
TRACTOR TIRE MOUNTING
Filed May 24, 1940  2 Sheets-Sheet 1

INVENTOR
Littleton B. Sloneker
By Ely & Frye
ATTORNEYS

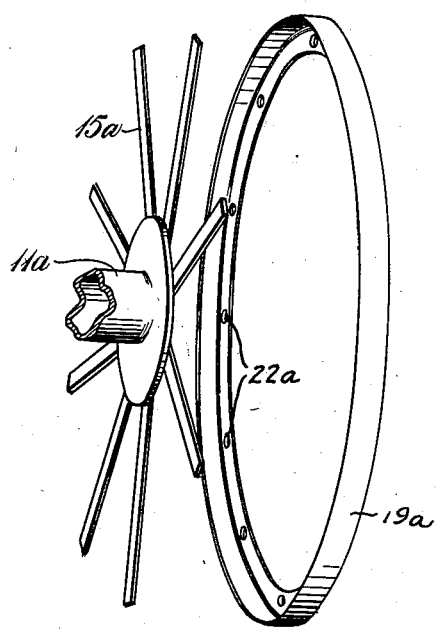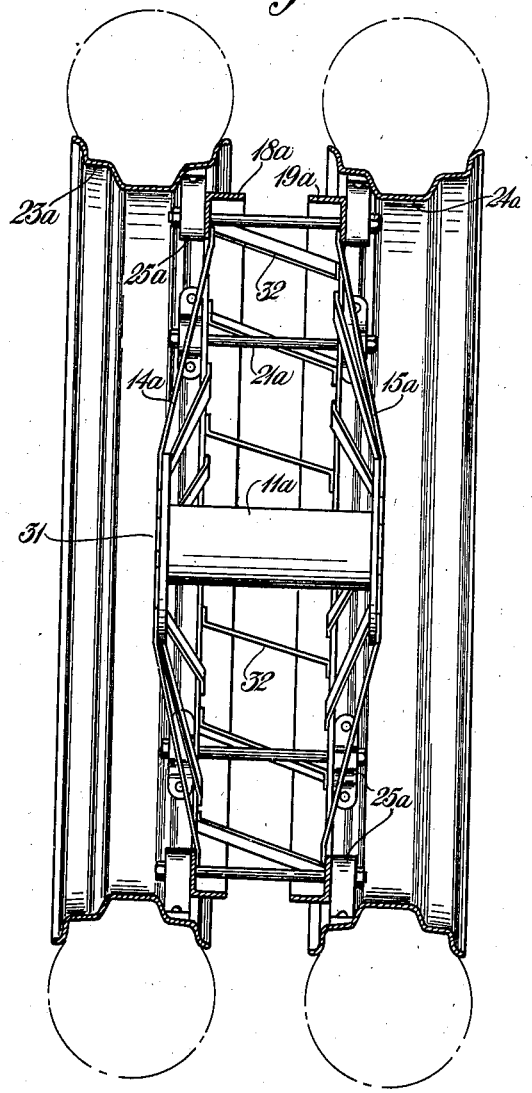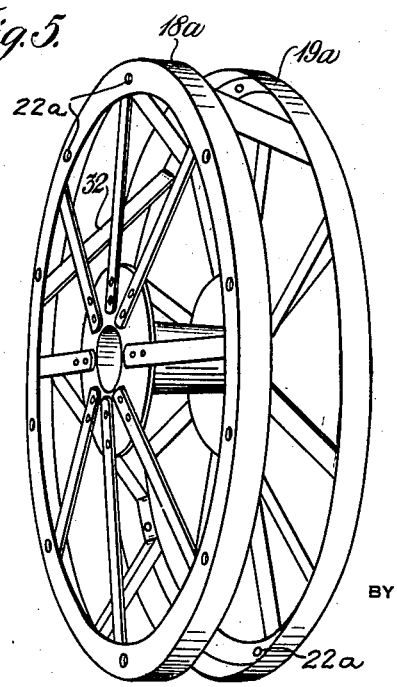

Patented July 21, 1942

2,290,623

UNITED STATES PATENT OFFICE 2,290,623

TRACTOR TIRE MOUNTING

Littleton B. Sloneker, Memphis, Tenn., assignor to The Firestone Tire & Rubber Company, Akron, Ohio, a corporation of Ohio Application May 24, 1940, Serial No. 337,004

13 Claims. (Cl. 301—39)

This invention relates generally to wheels, more especially to mounting tires upon wheels used on farm equipment, road-grading machinery, and the like.

In the past, substantially all farm equipment and road-grading machinery have had annular metal wheels to which have been secured some kind of metallic lugs so that proper traction can be obtained through the wheels. Recently the advantages of equipping farm machinery etc., with pneumatic rubber tires have been shown so that at present there is a great demand for devices to permit the old style metal wheels on such equipment to carry pneumatic rubber wheels. Adaption of old style equipment for pneumatic rubber tires has sometimes required purchase of entirely new wheel assemblies, which obviously is highly expensive. Sometimes the old style metal wheels have been cut down to form suitable wheel bases for mounting pneumatic rubber tires, but this also is rather expensive and prevents the wheel from again being used in its original form. Changing a metal wheel, which normally had metal lugs associated therewith to a construction which is adapted to receive a pneumatic tire, or tires, is even more difficult in that for some uses the old style metallic lugs may be preferred, even though pneumatic tires are best suited for at least a majority of the uses of the wheels. Hence, it is desirable to adapt the wheels to receive, interchangeably, pneumatic rubber tires, and metallic lugs. In some instances it is even desirable to combine the use of a pneumatic rubber tire with metal lugs on the same wheel, especially where the soil is exceedingly soft, or frozen.

The general object of this invention is to provide an inexpensive, sturdy wheel changeover device for metallic wheels which normally have metallic lugs associated therewith, whereby pneumatic rubber tires can be readily positioned on the wheels.

Another object of the invention is to provide a wheel changeover assembly that permits both the metallic lugs and pneumatic rubber tires to be carried simultaneously on the wheel.

A further object of the invention is to provide a sturdy, easily formed positioning member for mounting pneumatic rubber tires on a wheel construction originally having metallic lugs thereon.

The above and further objects of the invention will be manifest from the following specification.

Attention is directed to the accompanying drawings, in which:

Figure 3 is a fragmentary side elevation of a portion of the apparatus shown in Figure 2;

Figure 4 is a perspective view of a modified form of the invention showing it only partially assembled;

Figure 6 is a vertical sectional elevation of the wheel shown in Figure 5 with pneumatic tire rims secured thereto;

Figure 1:
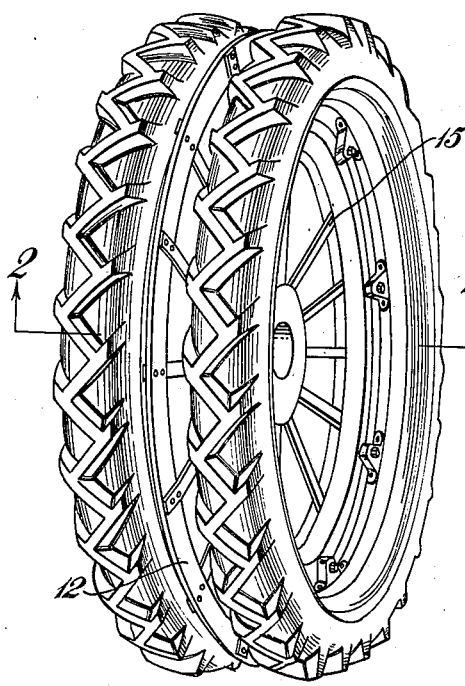
Figure 1 is a perspective view of one embodiment of the invention.
Figure 2:
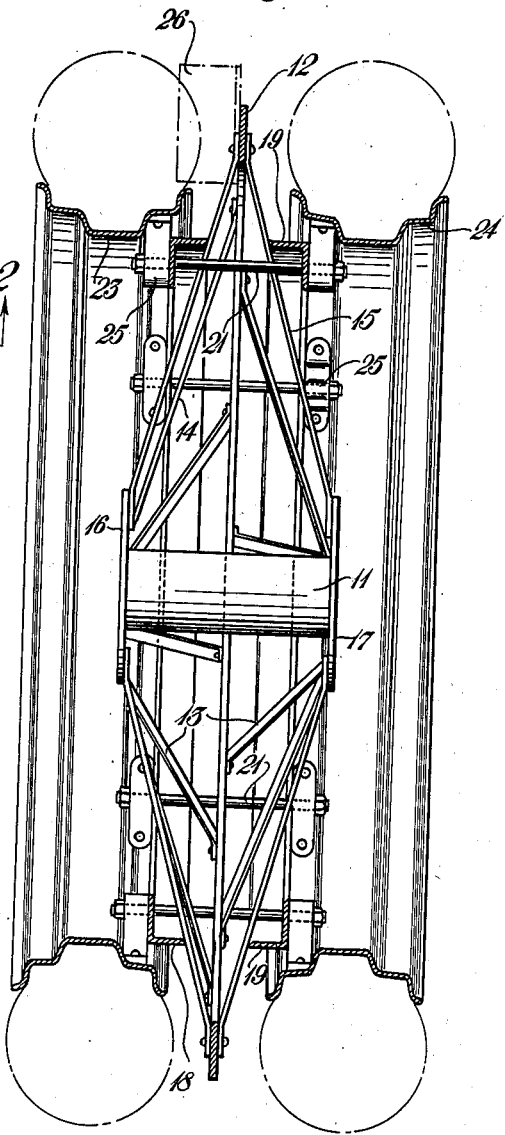
Figure 2 is a horizontal sectional elevation taken on line 2—2 of Figure 1.

The wheel assembly 10 of the invention, shown in Figures 1 through 3, specifically comprises a hub 11 which includes an annular peripheral member 12 which is carried on the hub 11 by the spokes 13. These spokes 13 comprise two sets 14 and 15, the inner leg of each spoke of the set 14 being secured to an annular disk 16 that is carried by the hub 11 at one end thereof whereas the inner end of each spoke of the set 15 is secured to a disk 17 that is welded or otherwise secured to the other end of the hub 11. The radially outer ends of all of the spokes may be welded or otherwise secured to the member 12 in accordance with standard practice. Hence the wheel assembly is thicker at its center than at its outer edge due to the spokes being associated with both ends of the hub 11 and extending axially inwardly relative thereto to engage with the member 12.

To provide means for mounting pneumatic rubber tires on the wheel assembly 10 in its original form, two annular anchor rings 18 and 19 are associated with the axially outer surfaces of the sets 14, 15, respectively, of spokes 13. Figure 2 best shows that the rings 18 and 19 are of right angular cross section and that the radially outer legs of the anchor rings 18 and 19 are cylindrical and concentric with the hub 11. Bolts 21 extend through the spaced sets 14 and 15 of spokes 13 and holes 22 formed in the anchor rings 18 and 19 whereby the anchor rings can be drawn tightly against the axially outer surfaces of the spokes 13, as shown. Note that all of the spokes 13 extend radially outwardly but axially inwardly of the hub 11 so that the unit formed from the anchor rings 18 and 19 by the bolts 21 is rigidly or fixedly mounted on the wheel assembly 10. The pneumatic tire rims 23 and 24, which have a plurality of lugs 25 riveted or otherwise secured to their radially inward surfaces at one side of each rim, can be mounted on the wheel assembly 10 by the bolts 21 engaging with the lugs 25. While the rims 23 and 24 are removably associated with the wheel assembly in the structure shown, they could be welded or otherwise permanently secured to the assembly, when desired.

It will be noted that one of the rims 23 or 24 can be removed from the wheel assembly 10 and the remaining rim left in association with the wheel whereupon a plurality of metallic lugs, indicated in broken lines at 26 can be mounted upon the peripheral member 12 of the wheel assembly on the side thereof opposite to that with which the rim is associated. These lugs normally extend radially outwardly slightly relative to the pneumatic rubber tire carried on the tire rim associated with the wheel assembly. This assembly is particularly suited for use in special types of soil wherein the rubber tires prevent the wheel assembly from sinking into the soil whereas the metallic lugs furnish substantially all of the traction required from the wheel assembly. A particular feature of the invention is that it permits pneumatic rubber tires to be associated with a metal wheel of standard construction without changing the metal wheel. Then the pneumatic rubber tires can be tried out and, if found unsatisfactory for any reason, then the old style metal lugs can readily be replaced on the wheel. However, if the rubber tires are shown to be satisfactory, then the anchor rings 18 and 19 may be permanently secured to the wheel assembly.

Figure 5:
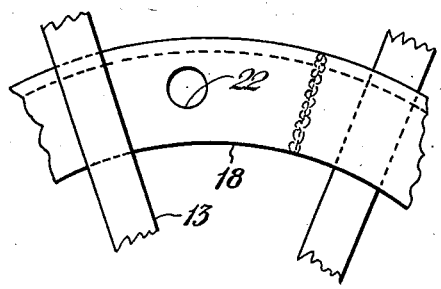
Figure 5 is a perspective view of the modification of the invention shown in Figure 4 in its next stage of assembly.

Figures 4 through 6 of the accompanying drawings show a wheel assembly 31 which is made from the wheel shown in Figures 1 through 3 by cutting or burning the peripheral member 12 from the ends of the spokes 13. In this case there is shown a hub 11a from which sets 14a and 15a of spokes extend. These spokes carry anchor rings 18a and 19a at their outer ends and the wheel assembly 31 then is strengthened by reinforcing members 32 that extend between and are secured to the anchor rings 18a and 19a. The wheel assembly 31 is completed by pneumatic tire rims 23a and 24a that are held in place by means of bolts 21a that extend through holes 22a and engage with lugs 25a carried by the tire rims and secure same to the anchor rings 18a and 19a.

It will be appreciated that the anchor rings may be of forms other than that shown. For example, the portion of the angular anchor ring concentric with the hubs may be moved to the inner edge of the angular anchor member, as shown in the member 35 disclosed in Figure 7. Also, the anchor members could be of other than annular shape, when desired, while obviously all of the changeover means can be either fixedly or removably assembled with each other.

Figures 7, 8:
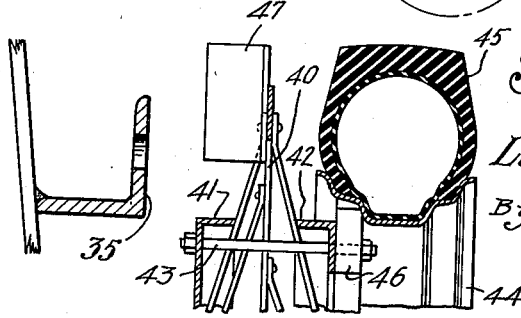
Figure 7 is a sectional elevation of a modified anchor member of the invention.
Figure 8 is a detail section of a further modification of the invention.

In the modified embodiment of the invention shown in Figure 8, a wheel 40, similar to that shown in Figure 1, is provided and anchor rings 41 and 42 are mounted thereon by a plurality of circumferentially spaced bolts 43 which draw the anchor rings against the spokes of the wheel 40 to secure them to the wheel assembly. A pneumatic tire rim 44, carrying a pneumatic tire 45, is secured to the wheel 40 by the bolts 43 engaging with several circumferentially spaced lugs 46 secured to the inner periphery of the rim. The wheel assembly is completed by a plurality of metallic lugs 47, which are substantially "L shaped in section" and which are secured to circumferentially spaced portions of the wheel at the periphery thereof. Note that the outer peripheries of the lugs 47 and the tire 45 are shown as being substantially equal, but it will be seen that the specific relationship of these outer diameters may be varied in any desired manner in view of the exact use for which the wheel is intended.

The construction shown in Figure 2 has the further feature that it can temporarily be used to mount tractor wheels having metal lugs thereon on rubber tires to permit the tractor to be driven over roads on which metal lugged wheels are prohibited. Then the rubber tire, and even the anchor rings mounting the tire and rim on the wheel, can be removed when the tractor reaches its destination. Of course, the diameter of the tire must exceed that of the metal lugs and the diameter of the anchor rings may be increased to aid in securing this result. When the metal lugs and rubber tire are to be used simultaneously on a wheel, the diameters of the two can be arranged as desired in view of the soil conditions under which the wheel is to operate.

While a complete description of several embodiments of the invention has been given herein, it will be understood that various modifications thereof may be made without departing from the scope of the invention, as defined in the appended claims.

What is claimed is:

1. In a wheel assembly, a relatively wide hub, a narrow ring, spokes mounting said narrow ring on said hub, said spokes being associated with opposite sides of said narrow ring and extending axially outwardly but radially inwardly therefrom, anchor rings of angular cross section associated with said spokes adjacent said narrow ring, bolts extending through the spaces between said spokes and engaging with said anchor rings to draw said anchor rings against said spokes and secure them in such position, a pneumatic tire rim, lugs secured to said tire rim and engaged by said bolts to mount said tire rim on said spokes on one side of said wheel assembly, and traction lugs removably secured to and extending radially outwardly from said narrow ring on the side thereof opposite to that with which said tire rim is associated whereby the wheel assembly can be supported on a pneumatic tire and traction lugs at the same time.

2. In a wheel assembly, a relatively wide hub, a peripheral member, spokes mounting said member on said hub, said spokes being associated with opposite sides of said member and extending axially outwardly but radially inwardly therefrom, anchor rings of angular cross section associated with the outer sides of said spokes, bolts extending between and engaging with said anchor rings, a pneumatic tire rim, lugs secured to said tire rim and engaged by said bolts to mount said tire on said anchor ring on one side of said wheel assembly, and traction lugs removably secured to and extending radially outwardly from said member on the side thereof opposite to that with which said tire rim is associated whereby the wheel assembly can be supported on a pneumatic tire and traction lugs at the same time.

3. In a wheel assembly, a relatively wide hub, peripheral ring, spokes mounting said ring on said hub, said spokes being associated with opposite sides of said ring and extending axially outwardly and radially inwardly therefrom, anchor rings of angular cross section associated with the axially outermost portions of said spokes, bolts extending through the spaces between said spokes and engaging with said anchor rings to draw said anchor rings against said spokes and secure them in position, a pneumatic tire rim, and lugs secured to said tire rim and engaged by said bolts to mount said tire rim on said spokes on one side of said wheel assembly.

4. In a wheel assembly, a hub, a series of spokes extending out substantially radially from each end of said hub, a separate anchor ring of angular section secured to each series of said spokes adjacent the ends thereof, reinforcing members extending between said anchor rings, pneumatic tire rims, lugs secured to one side of the radially inner surfaces of said tire rims, and bolts secured between said anchor rings and engaging with said lugs to secure said tire rims removably to the wheel assembly.

5. In a wheel assembly, a hub, a series of spokes extending out substantially radially from each end of said hub, a separate anchor ring associated with each series of said spokes, pneumatic tire rims, lugs secured to the radially inner surfaces of said tire rims, and means extending through said anchor rings and engaging with said lugs to secure said tire rims to the wheel assembly.

6. In a wheel assembly, a hub, a series of spokes extending out substantially radially from each end of said hub, a separate anchor member secured to each series of said spokes adjacent the ends thereof, reinforcing members extending between said anchor members, pneumatic tire rims, and means associated with said anchor members and engaging with said tire rims to secure same to the wheel assembly.

7. In a wheel assembly, a hub, a peripheral member, spokes secured to both said member and spaced portions of said hub to form a unit thereof, said spokes extending axially inwardly adjacent said member, anchor rings of angular cross section secured to said spokes, and pneumatic tire rims removably secured to said anchor rings.

8. In a wheel assembly, a hub, an annular member, spokes secured to both said annular member and said hub to form a unit thereof, anchor means associated with said spokes intermediate the ends thereof, and pneumatic tire rims associated with said anchor means.

9. A wheel assembly as in claim 5 wherein said anchor means comprises an annular ring which is right angular in cross section and has the radially outer leg thereof parallel to the axis of the wheel.

10. A wheel assembly as in claim 5 wherein said anchor means comprises an annular ring which is right angular in cross section and has the radially inner leg thereof parallel to the axis of the wheel.

11. In a wheel assembly, a hub, a peripheral member larger in diameter but shorter in an axial direction than said hub, spokes mounting said peripheral member on said hub and converging radially outwardly from said hub to said peripheral member, anchoring means associated with the axial outer sides of said spokes, means fixedly positioning said anchoring means on said spokes, a pneumatic tire rim, a pneumatic tire mounted on said tire rim, means associating said tire rim with said anchoring means, and metal traction lugs secured to said peripheral member on the side thereof opposite to that with which said pneumatic tire is associated.

12. In a wheel assembly, a hub, a peripheral member larger in diameter but shorter in an axial direction than said hub, spokes extending from each end of said hub to mount said peripheral member on said hub and form two series of spokes, all of said spokes converging radially outwardly from said hub to said peripheral member, anchoring means associated with the outer sides of each series of said spokes, means fixedly positioning said anchoring means against said spokes, a pneumatic tire rim, means securing said tire rim to the part of said anchoring means associated with one series of said spokes, and metal traction lugs secured to said peripheral member on the side thereof opposite to that with which said pneumatic tire is associated.

13. In a wheel assembly, a hub, a series of spokes converging radially outwardly from each end of said hub, an annular member carried by the ends of said spokes, an anchor ring disposed substantially concentrically of said hub and engaging the spokes of one series at points intermediate the hub and the outer ends of the spokes and axially inwardly from the hub engaging spoke ends, a rim adapted to receive a pneumatic tire, and means for the engagement of said tire rim with said anchor rim.

LITTLETON B. SLONEKER.